UNITED STATES PATENT OFFICE.

VICTOR LITZELMANN, OF NEW YORK, N. Y., ASSIGNOR TO MAX AMS, OF SAME PLACE.

PROCESS OF EXTRACTING GLYCERINE FROM FATTY MATTER.

SPECIFICATION forming part of Letters Patent No. 267,753, dated November 21, 1882.

Application filed October 23, 1882. (No specimens.)

*To all whom it may concern:*

Be it known that I, VICTOR LITZELMANN, of the city of New York, county and State of New York, have invented a new and Improved Process of Extracting Glycerine from Fatty Matter, of which the following specification is a full, clear, and exact description.

This invention has for its object to extract the glycerine from fatty matter used in the manufacture of soap.

The invention consists in adding to the fatty matter water and a zinc preparation; also, in the details of the process employed, and, finally, in the particular zinc preparation used, all as hereinafter more fully set out.

In carrying my invention into effect I proceed as follows: Into an autoclave of a capacity of ten thousand pounds I introduce six thousand pounds of fatty matter, one thousand four hundred pounds of water, and ten pounds of a zinc preparation. The zinc preparation is preferably mixed with the water before both are introduced. For the zinc preparation I prefer to use zinc partly oxidized, the best results being attained by a preparation containing seventy to ninety-five per cent. of zinc and five to thirty per cent. of oxide of zinc, this preparation being obtained by partial distillation of zinc in a retort; but in place of this particular preparation a different proportion may be used, or pure zinc or pure oxide of zinc may be employed, though the results therewith attained are not as good as with my particular preparation as above given. After the fatty matter, water, and zinc preparation are introduced into the autoclave, steam under pressure of one hundred and twenty to one hundred and thirty pounds is introduced, and this pressure kept up for about four hours. The resultant mass, which will consist of saponified fat and water containing glycerine, is then discharged into a suitable tank and the saponified fat will settle on the surface. The water containing the glycerine is finally drawn off at the bottom and evaporated until the glycerine remains over. The fatty matter is used in the manufacture of soap in the usual manner.

I claim—

1. The process of extracting glycerine from fatty matter, which consists in adding to said fatty matter water and a zinc preparation, substantially as specified.

2. The process of extracting glycerine from fatty matter which consists in mixing fatty matter, water, and a zinc preparation, subjecting the mixture to the action of steam under pressure, allowing the resultant mass to settle, drawing off the water containing the glycerine, and finally evaporating the water, substantially as hereinabove specified.

3. In the process of extracting glycerine from fatty matter, the employment of a zinc preparation consisting of seventy to ninety-five per cent. of zinc and five to thirty per cent. of oxide of zinc, substantially as specified.

VICTOR LITZELMANN.

Witnesses:
 JO. J. MCGINLEY,
 RICHARD WEINACHT.